M. C. DUGGER.
VEHICLE WHEEL.
APPLICATION FILED MAR. 29, 1913.
1,146,314.
Patented July 13, 1915.
2 SHEETS—SHEET 1.
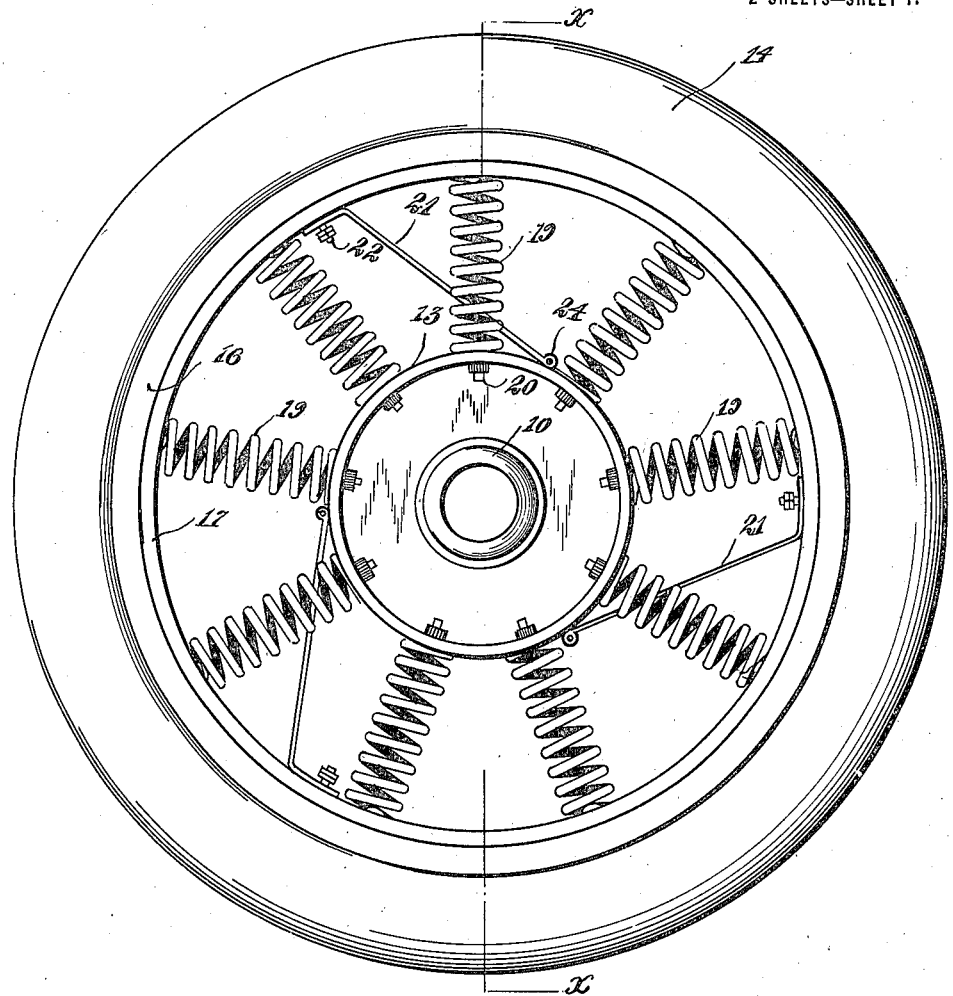
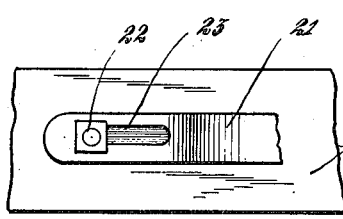
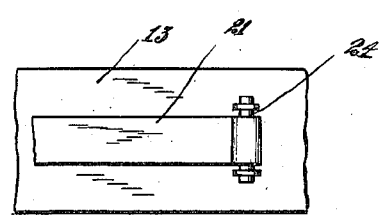
WITNESSES
INVENTOR
*his* Attorney

M. C. DUGGER.
VEHICLE WHEEL.
APPLICATION FILED MAR. 29, 1913.

1,146,314.

Patented July 13, 1915.
2 SHEETS—SHEET 2.

WITNESSES

INVENTOR
Milton C. Dugger
his Attorney

UNITED STATES PATENT OFFICE.

MILTON C. DUGGER, OF CLEARWATER, KANSAS.

VEHICLE-WHEEL.

1,146,314. Specification of Letters Patent. Patented July 13, 1915.

Application filed March 29, 1913. Serial No. 757,659.

*To all whom it may concern:*

Be it known that I, MILTON C. DUGGER, a citizen of the United States, residing at Clearwater, in the county of Sedgwick and State of Kansas, have invented certain new and useful Improvements in Vehicle-Wheels, of which the following is a specification.

This invention relates to vehicle wheels and more particularly to that class commonly known as resilient wheels, wherein is provided spring spokes and a solid resilient tread portion thereby eliminating the use of the troublesome pneumatic tire and inelastic spokes.

An object of this invention is the provision of spokes arranged so as to support the wheel against lateral thrust, and at the same time allowing of the proper resiliency and relieving the wheel from all jarring and concussion due to road obstructions.

Another object of this invention is the manner in which the resilient tread is secured to the rim of the wheel, wherein the same is positively locked.

Other objects as well as the nature, characteristic features and scope of my invention will be more readily understood from the following description taken in connection with the accompanying drawings and pointed out in the claims forming a part of this specification wherein:—

Figure 4:
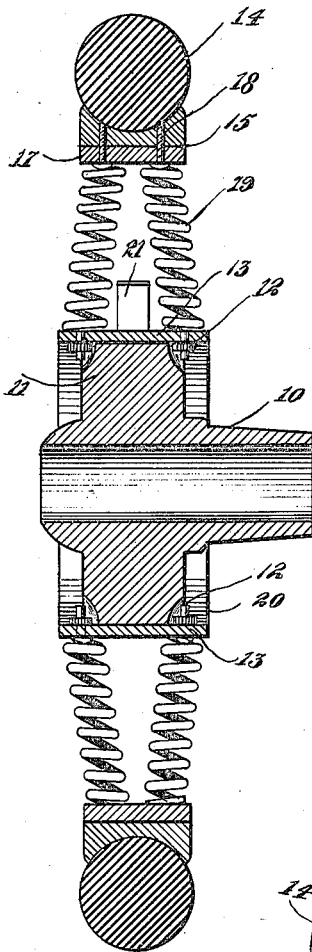
Figure 5:
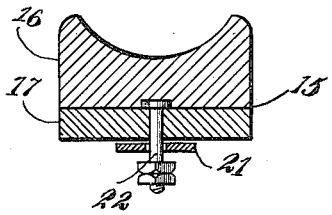
Figure 7:
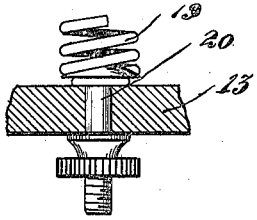
Figure 6:
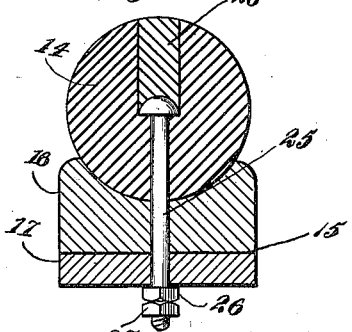

Figure 1 is a side elevation of my improved device showing the spokes in their normal position; Fig. 2 is a detail fragmentary plan view of the inner reinforcing rim and one of the spoke connections; Fig. 3 is a detail fragmentary plan view of the hub flange and one of the spoke connections; Fig. 4 is a cross sectional view taken on the line x—x of Fig. 1; Fig. 5 is a detail transverse section through the rim showing the adjustable connection between one of the spokes and the inner reinforcing rim section; Fig. 6 is a detail transverse section of the outer portion of the wheel showing the manner in which the resilient tread is held to the rim; and Fig. 7 is a detail sectional view of the hub flange and one of the spoke connections.

In the drawings wherein is shown the preferred form of my invention the numeral 10 designtaes the hub which is provided with the web portion 11, said web portion having recesses 12 formed therein for the purpose hereinafter described. The hub 10 is provided with an annular flange 13 on the peripheral edge thereof which extends outwardly on both sides of said hub as shown to advantage in Fig. 4 of the drawings.

The numeral 14 designates a solid resilient tread which is composed of rubber or any other suitable material, and is shown as seated in the ordinary manner in the rim 15, the rim being provided in two sections, the outer 16 which is preferably formed of wood and the inner reinforcing section 17 of metal and being secured together through the medium of the threaded bolts 18.

Spokes 19 are arranged in two sets, one set for each end of the hub flange 13, and the spoke sets inclined inwardly toward each other to the inner reinforcing rim section 17 and having eyelets formed on their opposite ends, so as to be conveniently secured by the head of the bolts 18 to the inner reinforcing rim 17 and to the annular flange 13 by the bolts 20. The spokes 19 are formed preferably of helical or coil springs in order that the proper resiliency may be had when traveling over rough roads.

Pivotally connected to the central portion of the hub flange 13 are the flat springs 21 which extend diagonally to the inner reinforcing rim section 17 and are there held by the bolts 22. This flat or leaf spring has a portion bent at an obtuse angle to the body portion thereof, said angle portion being adapted for close contact with the inner face of the inner reinforcing rim section and being provided with a longitudinal slot 23 in which the bolt 22 operates when undue pressure is exerted on the wheel. It will be readily seen that this spring 21 which is pivoted to the hub flange 13 as shown at 24 will support the wheel from lateral thrust or dishing as has heretofore been the case with vehicle wheels of this type.

The resilient tread 14 is secured to the rim 17 through the medium of an elongated bolt 25 which is counter-sunk in the tread portion to approximately midway thereof and having the free end extending through the rest of the tire and the two rim sections, being positively locked thereto by the ordinary nut 26 and the jam nut 27. The recess which was formed by cutting out a portion 28 of the tread so as to allow for the countersinking of the bolt 25 is refilled by the same portion 28 which was taken from the tread, and vulcanized so as to form a smooth surface as shown to advantage in Fig. 6.

It will be understood that the above description and accompanying drawings comprehend only the general and preferrred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. In a resilient wheel a hub, a rim, said rim comprising an outer section and an inner reinforcing section for said outer section, a hub flange carried by the peripheral edge of the hub and extending outwardly from the same, a plurality of helical springs having their opposite ends secured to the hub flange and inner reinforcing rim section respectively, and a plurality of flat springs hingedly connected at one end to the hub and the opposite ends bent at obtuse angles to the body thereof adapted for sliding engagement with said inner reinforcing rim section to support the wheel against lateral thrust.

2. In a resilient wheel a hub, a rim, said rim comprising an outer section and an inner reinforcing section for said outer section, a hub flange carried by the peripheral edge of the hub and extending outwardly from the same, a plurality of helical springs having their opposite ends secured to the hub flange and inner reinforcing rim section respectively, a plurality of flat springs hingedly connected at one end to the hub and the opposite ends bent at obtuse angles to the body thereof, said angle portions being provided with longitudinal slots, and bolts carried by said rim and engaging in said longitudinal slot whereby to support the wheel against lateral thrust.

3. A spring wheel, the combination with a hub and rim, of a flange arranged on the outer periphery of said hub having the marginal edges thereof extending therebeyond, helical springs one end of each of which is engaged with said hub flange adjacent one of the marginal edges thereof, the opposite end having engagement with the inner periphery of the rim, a plurality of flat springs one end of each of which is pivotally engaged with said flange intermediate the marginal edges thereof, the opposite end thereof being offset and lying snugly in engagement with the inner periphery of said rim and having sliding engagement therewith whereby to prevent the lateral thrust of said wheel.

In testimony whereof I affix my signature in presence of two witnesses.

MILTON C. DUGGER.

Witnesses:
   D. S. STUCKEY,
   Z. F. MATTHEWS.